US012611991B2

(12) United States Patent
Biegler et al.

(10) Patent No.: US 12,611,991 B2
(45) Date of Patent: Apr. 28, 2026

(54) CARGO DECK FOR VEHICLE INTERIOR

(71) Applicant: Troy Sheet Metal Works, Inc.,
Montebello, CA (US)

(72) Inventors: Louis Steven Biegler, Corona, CA
(US); Paul Francis McNicoll,
Alhambra, CA (US); Noe Gallardo,
South Gate, CA (US)

(73) Assignee: Troy Sheet Metal Works, Inc.,
Montebello, CA (US)

( * ) Notice: Subject to any disclaimer, the term of this
patent is extended or adjusted under 35
U.S.C. 154(b) by 372 days.

(21) Appl. No.: 18/211,866

(22) Filed: Jun. 20, 2023

(65) Prior Publication Data

US 2023/0406213 A1     Dec. 21, 2023

Related U.S. Application Data

(60) Provisional application No. 63/353,833, filed on Jun.
20, 2022.

(51) Int. Cl.
B60R 7/02 (2006.01)
B60R 7/08 (2006.01)

(52) U.S. Cl.
CPC . B60R 7/02 (2013.01); B60R 7/08 (2013.01)

(58) Field of Classification Search
CPC ................................... B60R 7/02; B60R 7/08
See application file for complete search history.

(56) References Cited

U.S. PATENT DOCUMENTS

| | | | | |
|---|---|---|---|---|
| 5,564,776 | A | * | 10/1996 | Schlachter ................ B60R 9/00 224/404 |
| 5,979,725 | A | * | 11/1999 | Lehrman ................... B60R 7/02 220/23.88 |
| 5,992,719 | A | * | 11/1999 | Carter, III ................ B60R 9/00 220/8 |
| 6,241,137 | B1 | * | 6/2001 | Corr .......................... B60R 9/00 224/539 |

(Continued)

OTHER PUBLICATIONS

2020 Ford Police Interceptor Utility Elevated Cargo Deck-Troy
Products, https://troyproducts.com/product/2020-ford-police-interceptor-
utility-elevated-cargo-deck/, 3 Pages.

(Continued)

*Primary Examiner* — Aaron L Lembo
(74) *Attorney, Agent, or Firm* — Lowe Graham Jones
PLLC

(57) ABSTRACT

A cargo and storage deck for securement within the cargo
area of a vehicle. The cargo area of the vehicle has a floor
surface. The deck includes a deck upper surface, a support
member holding the deck above the floor of the vehicle, and
a lid on the rearward side to enclose the storage area. The
deck surface creates a storage area underneath such deck
surface and above the vehicle floor surface. The support
member is secured to the vehicle and to the deck surface.
The lid is hingedly secured to the support member or to the
deck surface. The lid provides access to the storage area
beneath the deck surface. The lid has an inner side facing the
storage area and an outer side opposite the inner side and
includes a lid stowage compartment accessible on the outer
side of the lid.

19 Claims, 7 Drawing Sheets

(56) References Cited

U.S. PATENT DOCUMENTS

| | | | | |
|---|---|---|---|---|
| 8,651,351 | B2 * | 2/2014 | Fowler | ..................... B60R 7/08 |
| | | | | 224/543 |
| 8,905,276 | B2 | 12/2014 | Bernert et al. | |
| 10,137,839 | B1 | 11/2018 | Kelley, Jr. | |
| 2004/0105744 | A1 * | 6/2004 | Warner | ..................... B60R 7/02 |
| | | | | 414/522 |
| 2022/0153200 | A1 * | 5/2022 | Anaya | ..................... B60R 7/02 |

OTHER PUBLICATIONS

2021 Dodge Durango Lift-up Cargo Mount-Troy Products, https://troyproducts.com/product/2021-dodge-durango-lift-up-cargo-mount/, 2 Pages.
Tilt-up Cargo Mount with Gas Shocks-Troy Products, https://troyproducts.com/product/tilt-up-cargo-mount-with-gas-shocks/, 3 Pages.
Easy-Lift Cargo Deck, Setina Manufacturing Inc., https://setina.wpengine.com/cargo-solutions/easy-lift-cargo-deck/, 4 Pages.
Cargo Storage Floor, Pro-Gard Products LLC., https://pro-gard.com/product/cargo-storage-floor-2/, 7 Pages.

* cited by examiner

CARGO DECK FOR VEHICLE INTERIOR

PRIORITY CLAIM

The present application is a non-provisional utility application of U.S. Provisional Application Ser. No. 63/353,833, entitled CARGO DECK FOR A VEHICLE, filed Jun. 20, 2022, in which the contents are hereby incorporated by reference.

FIELD OF THE INVENTION

The present invention generally relates to a storage and access system used in a cargo section of a vehicle. More specifically, the invention relates to a base, bottom level, or deck that provides storage and keeping of various equipment to be removed or fixed, upon which additional storage units or items may be placed. Additional storage items may be command centers, storage vaults, cargo organizers, or any variety of specialized equipment needed in a utility vehicle.

BACKGROUND OF THE INVENTION

Utility vehicles have increasingly become more popular than sedan type vehicles in law enforcement due to their capability to carry an increased load of equipment needed for police functions. While carrying the additional equipment, care must be taken to provide access to the spare tire, which is generally stored under the floor of the rear cargo area of utility vehicles.

Law enforcement vehicles are individually built to perform different functions. One may be a regular patrol vehicle while another may be built to act as a command center for incident control. Each type of vehicle will have different storage solutions built into the rear cargo area of the utility vehicle. The amount of equipment needed by law enforcement officers has grown considerably since the 1950s. This increased equipment load has caused a shift from the sedan type vehicles to utility or SUV law enforcement vehicles. Likewise, service vehicles for government entities and businesses have individual requirements for storage and access and benefit from the space and utility of SUVs.

In emergency situations law enforcement officers need rapid access to certain items, which should be the first things they encounter when accessing the rear cargo area of their vehicle. Rapid access items include, but are not limited to, tire deflation devices (e.g., Stop Sticks®), shoulder mounted firearms, or other less than lethal weapons.

Stop Sticks are tire-deflation devices for high-speed pursuits. Other such devices may alternatively be used. The key is to have the devices immediately available for use as they are used in high-pressure, quick-action scenarios.

Depending on the type of law enforcement vehicle and the functions required, shoulder mounted weapons such as carbines or rifles, and shotguns might need to be at the ready.

Less-than-lethal weapons shoot projectiles at lower velocities intended to inflict pain on the intended target enough to discourage further advancement towards the officer. Devices that emit pepper spray or tear-gas are also included in this category. Again, these are tools that need to be quickly accessible.

The purpose of this invention is to provide a storage and rapid-access location for these devices such that when a police officer exits the vehicle, goes to the rear cargo area, and lifts the rear hatch; these items are there for the officer to grasp and use. Other uses for emergency and non-emergency situations are also envisioned. For example, an off-road vehicle may wish to have vehicle recovery equipment close at hand. Safety equipment (fire extinguisher, etc.) may be another category of quick-access item. Essentially any items deemed necessary by the user or company employing the vehicle for tasks.

Examples of conventional cargo deck solutions include U.S. Pat. No. 6,883,851, issued on Apr. 26, 2005, to Kerry S. McClure; U.S. Pat. No. 8,939,335, issued on, Jan. 27, 2015, to Terry L. Setina; U.S. Pat. No. 9,221,400, issued on Dec. 29, 2015, to Terry L. Setina; U.S. Pat. No. 10,137,839, issued on Nov. 27, 2018, to Jack E. Kelley Jr.; U.S. Pat. No. 8,020,911, issued on Sep. 20, 2011, to Richard L. McKelvey; U.S. Pat. No. 8,905,276, issued on Dec. 9, 2014, to Joseph Bernert.

None of the above inventions and patents, taken either singly or in combination, is seen to describe the instant invention as claimed to provide the same storage and accessibility.

SUMMARY OF THE INVENTION

The present invention is a cargo deck storage system for vehicles that has a storage lid configured to contain equipment needed for rapid access situations.

This cargo deck provides storage compartments for tools or equipment in the lower rear cargo area of utility vehicles while allowing vehicle operators to easily access the vehicle spare tire. A platform is created on top of the deck for supporting other storage items such as command centers, vaults, cargo organizers, or pieces of equipment not contained in a specialized organizer.

In the case of public safety vehicles, the rear cargo area generally consists of a floor to ceiling barrier wall separating the rear cargo area from custodial occupants of the rear seat area, side walls on the driver and passenger sides, the vehicle roof, the rear hatch or door, and a floor. A spare tire is located beneath the main floor of the cargo area. The cargo deck described in this invention replaces or overlies the factory rear floor with a structural platform onto which other storage solution items can be placed.

The cargo deck includes two frame halves configured in a parallel manner and running longitudinally front-to-back within the rear cargo area. The frame halves have legs extending from the frame to connection points in the vehicle body. Between the frame halves an electronics drawer is preferably attached via drawer slides that are also attached to the frame halves. The drawer moves fore-and-aft to allow access to electronic equipment attached within the drawer. In one embodiment, a foam insert is cut to the shape of the tray, with sections removed in the shape of the equipment intended to be stored in the drawer. A secure lock on the drawer provides access by authorized technicians.

Forward and rear deck panels are attached between the frame halves and provide a structural solid floor within the rear cargo area.

Within the cargo deck are configured storage compartments for radio and electronic equipment, organizers, and storage bins.

The aft portion of the cargo deck includes a lid configured to provide storage for rapid access items used in emergency situations. These item types include, but are not limited to, tire deflation devices (e.g., Stop Sticks), firearms, or other non-lethal weapons.

The lid rotates up and down on two pivot points or hinges attached to the frame.

By lifting the lid and removing the organizer tray, access is provided to the vehicle spare tire.

Construction of the cargo deck is preferably made from heavy duty sheet steel, aluminum, or other alloys. Alternative construction materials may be wood, laminates, composites, plastics—all depending on cost, manufacturability, functionality, and use.

Accordingly, it is a principal object of the invention to provide a cargo deck and storage solutions for use in combination with a utility vehicle having front and rear passenger areas and a rear cargo area. The rear cargo area has surfaces herein, a front wall, a floor, a ceiling, side internal surfaces, and a rear hatch internal surface. The cargo deck replaces the existing floor of the rear cargo area and provides storage for radio equipment and other paraphernalia utilized by public safety officers in the performance of their duties. The top surface of the cargo deck establishes a structurally sound surface upon which other storage modules can rest, or other large bulky equipment may be placed.

At the rear of the cargo deck, a lid structure rotationally pivots upwards along its forward edge creating an access opening to compartments for storage and ultimately gives access to the vehicle spare tire. The aforementioned lid is configured to contain at least one of a variety of rapid-access items needed by public safety officers immediately when the rear lift gate of the vehicle is opened.

It is a further object of the invention to provide improved storage elements and arrangements thereof in a vehicle rear cargo area for the purposes described that is inexpensive, dependable, and fully effective in accomplishing its intended purposes.

These and other objects of the present invention will become readily apparent upon further review of the following specification and drawings.

BRIEF DESCRIPTION OF THE DRAWINGS

FIG. 4 is a rear-left isometric view of the driver and passenger side frame halves;

FIG. 5 is rear-left isometric view of the two frame halves with the electronics tray installed between the frame halves;

FIG. 6 is a rear-left isometric view of the two stow boxes and organizer tray positioned into the assembly; and FIG. 7 is a right-front isometric view of the cargo deck fully assembled.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a cargo deck with lid containing rapid-access items used, for example, by public safety officers in emergency situations.

The Cargo deck may be preferably constructed from steel or aluminum sheet metal, or a combination of the two. Other materials might alternatively be used depending on the intended function and items intended to be stored or secured.

Figure 1:
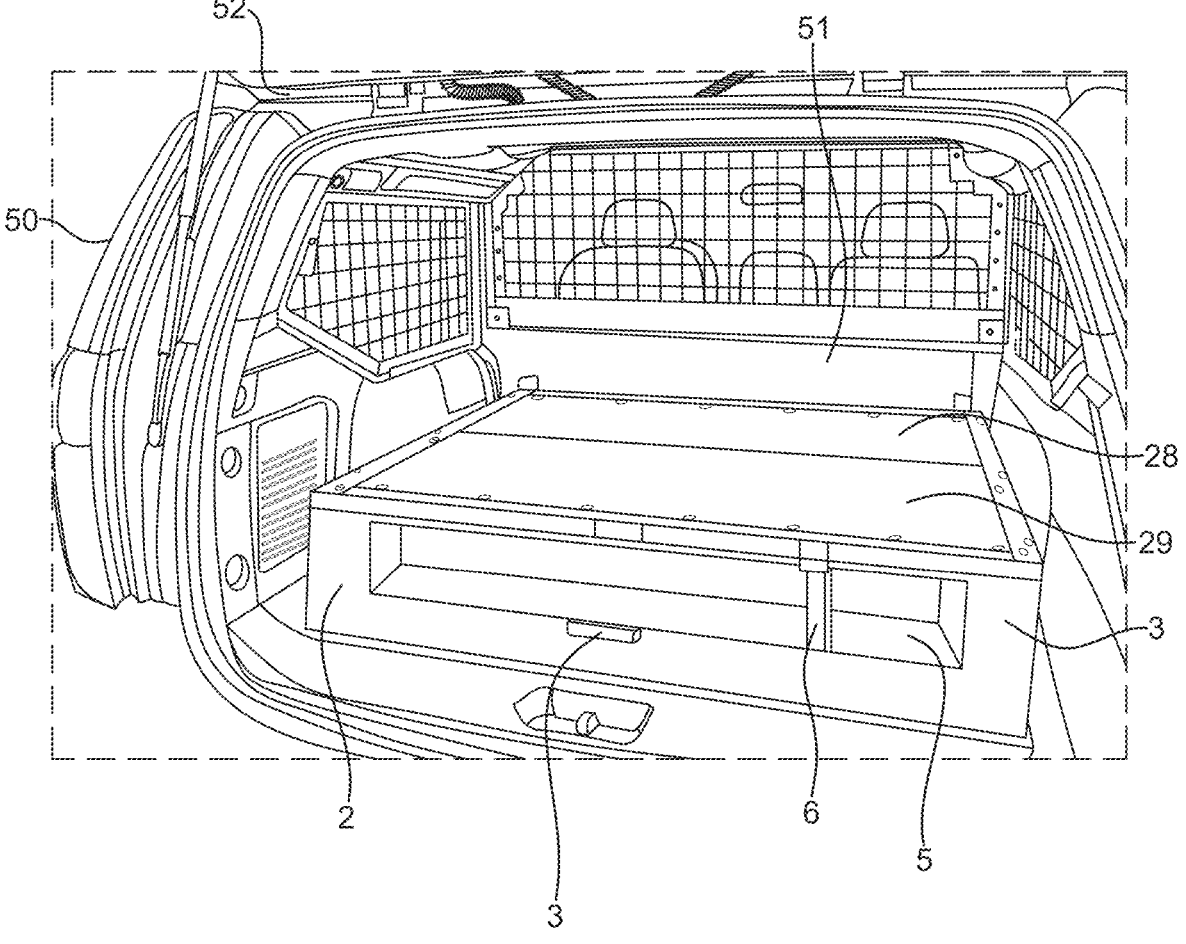
FIG. 1 is a perspective view of a partition installed in a vehicle.

FIG. 1 of the drawings illustrates a cargo deck 1 disposed within the rear cargo area 51 of a vehicle 50 that has the rear lift gate 52 open. When the lift gate is raised the first item encountered at the officer's mid-level is the lid assembly 2 of the cargo deck. The lid assembly is composed of an outer lid and an inner lid that form a compartment within which rapid-access items such as Stop Sticks, or in other embodiments a full length firearm, or less than lethal weapon may be contained, for example. An access opening 5 may exist in the outer lid helping define and contain the rapid access item held within. These rapid access items are the first things that a public safety officer may reach for in a fast-moving emergency situation. Or they are items that a user may want first at hand for any situation when opening the rear of the vehicle.

Figure 2:
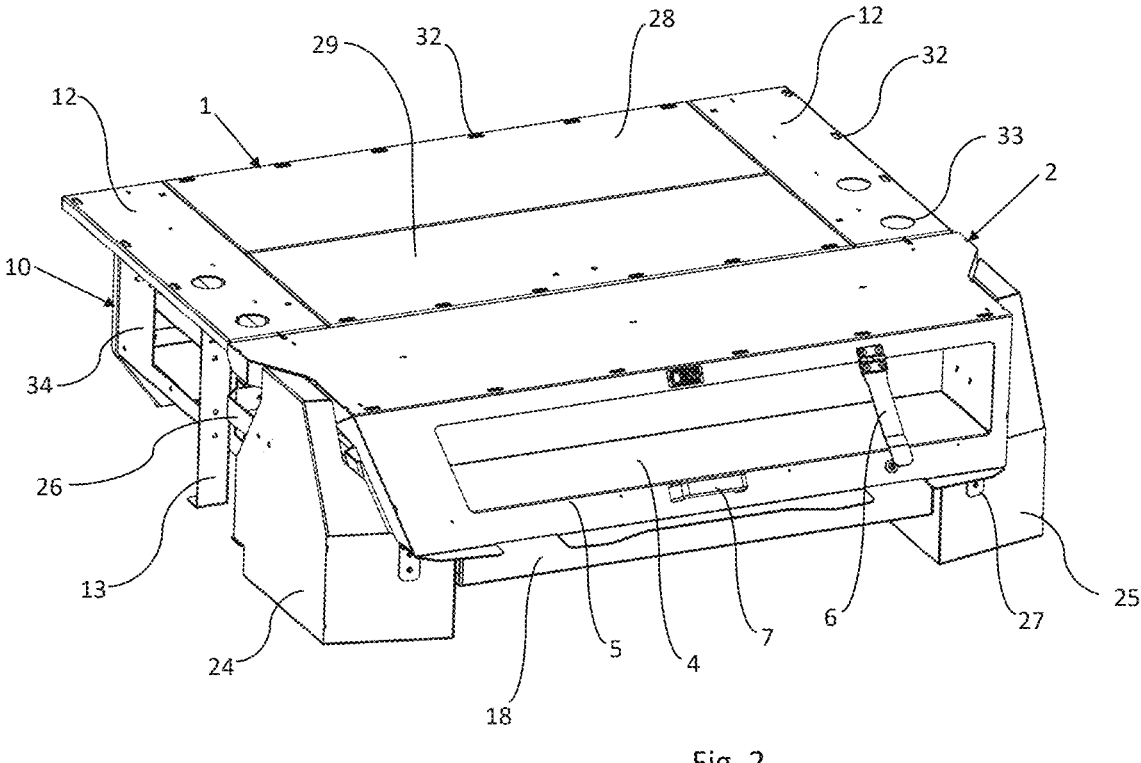
FIG. 2 is a rear-left isometric view of a cargo deck as it is fully assembled in the vehicle with the lid in the down or closed position and the vehicle not shown.

FIG. 1 and FIG. 2 illustrate an embodiment of the Cargo Deck configured to contain Stop Sticks. In an emergency situation where public safety officers desire to disable a fleeing vehicle, a public safety vehicle 50 in advance of the fleeing vehicle stops to deploy Stop Sticks tire deflation devices. The officer must quickly stop, open the liftgate 53, grab the Stop Sticks from the cargo deck lid 2, and throw them across the path of the oncoming vehicle. The Stop Sticks rupture the tires of the fleeing vehicle and the chase is ended.

To help contain the Stop Sticks within the lid of the Cargo Deck, a spring-loaded retention strap 6 is placed across the access opening 5. Alternatively, the rear face and opening 5 of the lid may be designed to abut against the lower portion of the liftgate of the vehicle, such that the lower liftgate portion retains the items from falling out of the opening during transit.

Aside from the Lid of the Cargo deck containing the rapid-access items, the Cargo Deck performs other important functions. The Cargo Deck provides a structurally strong platform upon which other cargo items such as command centers or utility boxes can be placed without concern that the factory cargo area floor will collapse. FIG. 2 shows the cargo deck with the lid in the down position. The construction of the cargo deck perimeter differs from vehicle to vehicle according to the shape of the rear cargo area at the level of the cargo deck. The shape and size of outer perimeter panels are designed to fill the space of the vehicle rear cargo area as to not allow gaps where small items may fall and be lost. The top perimeter is defined by the forward deck panel 28, the two frame top panels, the lid assembly 2, and the two stow boxes 24 and 25.

Comprising the top surface of the cargo deck are the forward deck panel 28, the two frame top panels 12, and the upper portion of the lid assembly 2. At various points on the top surface of the cargo deck oval shaped holes 32 are placed for bungee cord hooks to facilitate the use of bungee cord (or other) tie downs to secure miscellaneous equipment that may be placed on the cargo deck.

Assembly tool clearance holes 33 approximately 2" in diameter are located in the frame top panels to allow the insertion of socket wrench tools used in securing the frame assemblies 10 and 11 to the vehicle 50.

Figure 3:
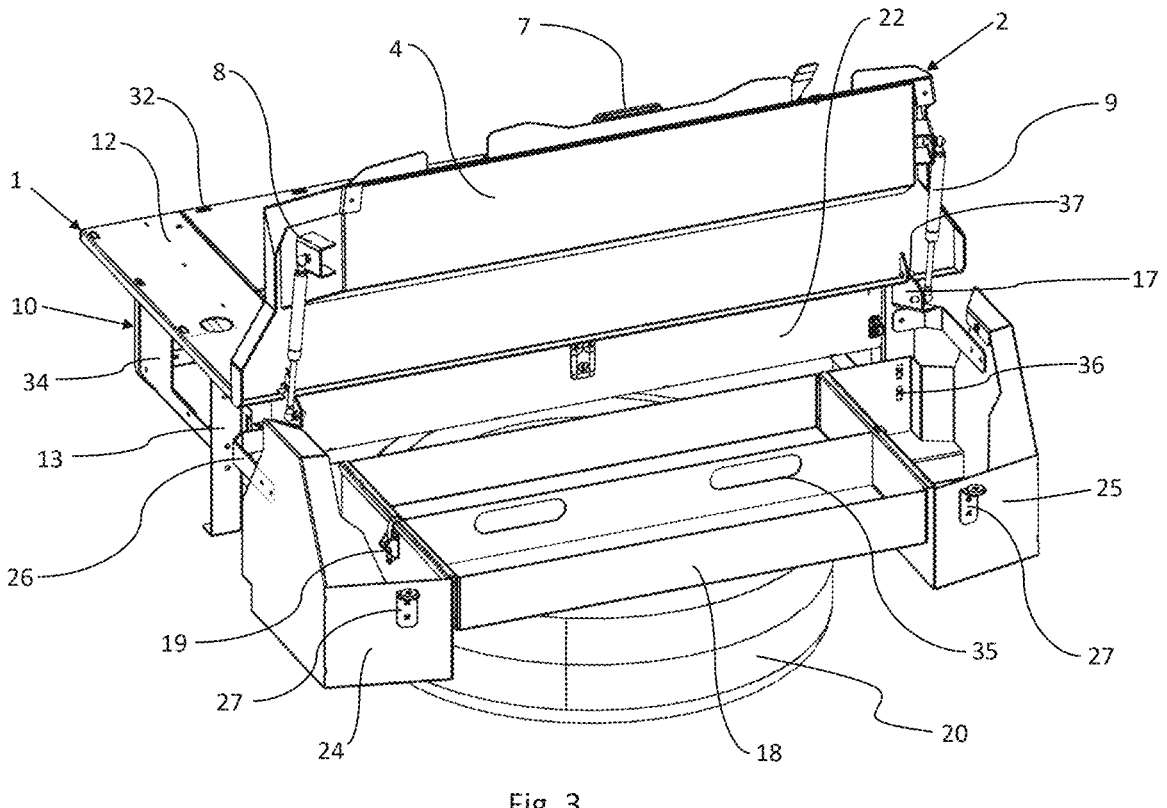
FIG. 3 is a rear-left isometric view of a cargo deck with the lid in the open or up position.

FIG. 3 illustrates the cargo deck with the lid assembly 2 in the up or open position. With the lid open various storage components available in the cargo deck are exposed.

Opening the lid assembly 2 is accomplished by grasping the lid handle 7 and raising it into the open position. To assist with lifting the lid assembly 2 and maintaining it in the open position, gas struts 9 are positioned on the driver side end and the passenger side end. The gas struts 9 are attached between a gas strut mounting bracket 8, which is attached to the lid assembly 2, and a lid pivot bracket 17. The orientation of the mounting points for the gas struts 9 is made in such manner to create an over-center mechanism, which assists the lid assembly 2 to maintain in the up position and in the down position when lowered. The struts or other lift-assist members are desirable since the rearward portion of lid preferably contains the quick-access items (such as Stop Sticks) noted above, thus adding to the weight of the lid.

Figure 4:
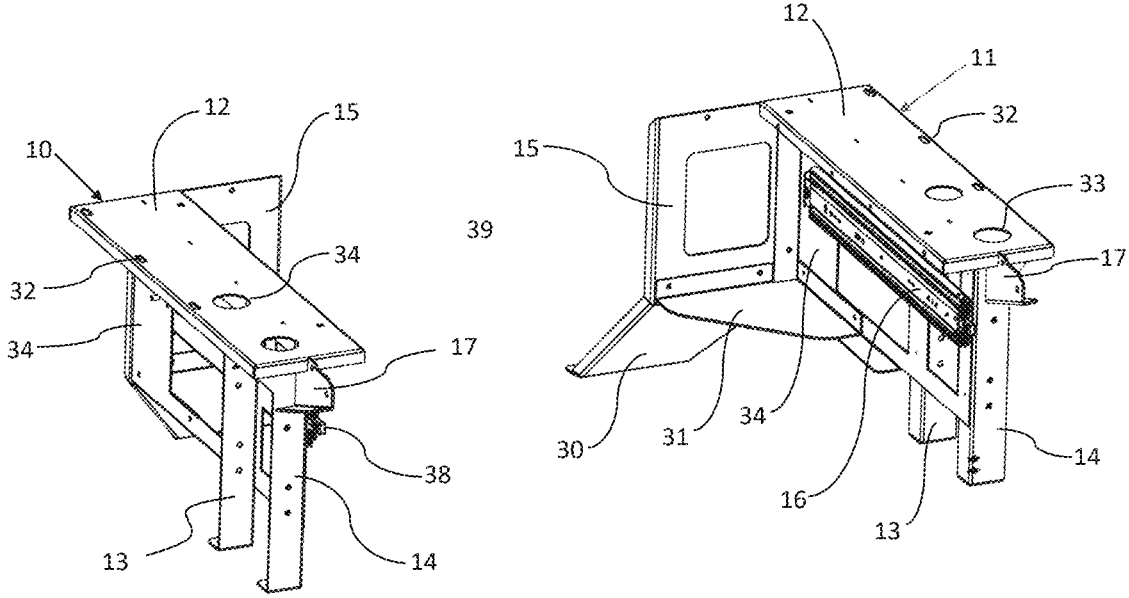
FIGS. 4 through 7 illustrate the component sub-assemblies of the cargo deck in the order that they might be placed into the vehicle.

The lid assembly 2 rotates on two pivot points 37 that are located on the lid pivot bracket 17, which is attached to the rear frame leg as illustrated in FIG. 4.

After raising the lid assembly 2 an organizer tray 18 is exposed in the center portion of the cargo deck 1. The organizer tray 18 provides stowage for equipment items such as flares. Hold-down latches 19 (Southco draw latch 97-50-353-11) on the driver and passenger sides of the organizer tray secure the organizer tray within the cargo deck to reduce rattle noise while the vehicle is in motion. These over-center latches compress the tray into the floor and/or tire of the vehicle for a secure hold of the removable tray. This eliminates or at least greatly reduces rattle and wear for a tight, quiet, and secure load. Two or more latches are preferred and are situated between fixed members, such as the stow boxes 24, 25 and the removable tray 18. The latches may bear down on the top edge of the tray or at another opening, edge, or connection point.

Oval shaped hand grip cutouts 35 in the center rib of the organizer tray 18 provide a mechanism for grasping the organizer tray 18 for removal after the hold down latches 19 have been released.

Removal of the organizer tray 18 creates an open space through which the spare tire 20 can be removed.

Two stowage bins, driver's side 24 and passenger side 25 are secured on either side of the organizer tray. The stowage bins 24 and 25 are configured to conform to the shape of the lower portion of the cargo area 51 and prevent items placed therein from falling into the spare tire 20 well of the vehicle. The stowage bins are secured to the framework of the cargo deck with screws at attachment points 36 and with stow box mounting brackets 26.

When the lid assembly 2 is lowered to its closed position, it is held in the closed position by two magnetic catches 27 that are attached to the stowage bins 24 and 25. Each magnetic catch consists of a bracket to which a neodymium magnet is attached. Of course, as noted above, the closed liftgate of the vehicle 50 also secures the lid in a closed configuration. Nevertheless, the magnets reduce minor movement and rattle.

FIG. 4 shows the two independent frame assemblies 10 and 11, which are attached to the driver and passenger sides of the vehicle in the cargo area 51. Each frame assembly consists of a frame side panel 34 which has a frame top panel 12, a mid-frame leg 13, and a rear frame leg 14 towards the rear portion of the frame assembly. At the forward end of the assembly a forward frame support 15 is attached perpendicular to the frame side panel 34. A frame angle support 31 acts as a gusset and connects the frame forward support 15 to the frame side panel 34 to add structural strength and rigidity to the frame assemblies 11 and 12. The forward frame leg 30 connects the frame assemblies 11 and 12 to the vehicle 50 and maintains the vertical position of the frame assemblies 11 and 12 within the vehicle.

Locking drawer slides 16 are attached on the inboard sides of the driver side 11 and passenger side 12 frame assemblies to support the electronics tray 22 and provide for forward and reverse motion for the tray 22. The locking drawer slides 16 have a locking lever 38 that extends from one end, facilitating the user to unlock the locking drawer slides 16 from their locked positions on both their in and out position locations.

Figure 5:
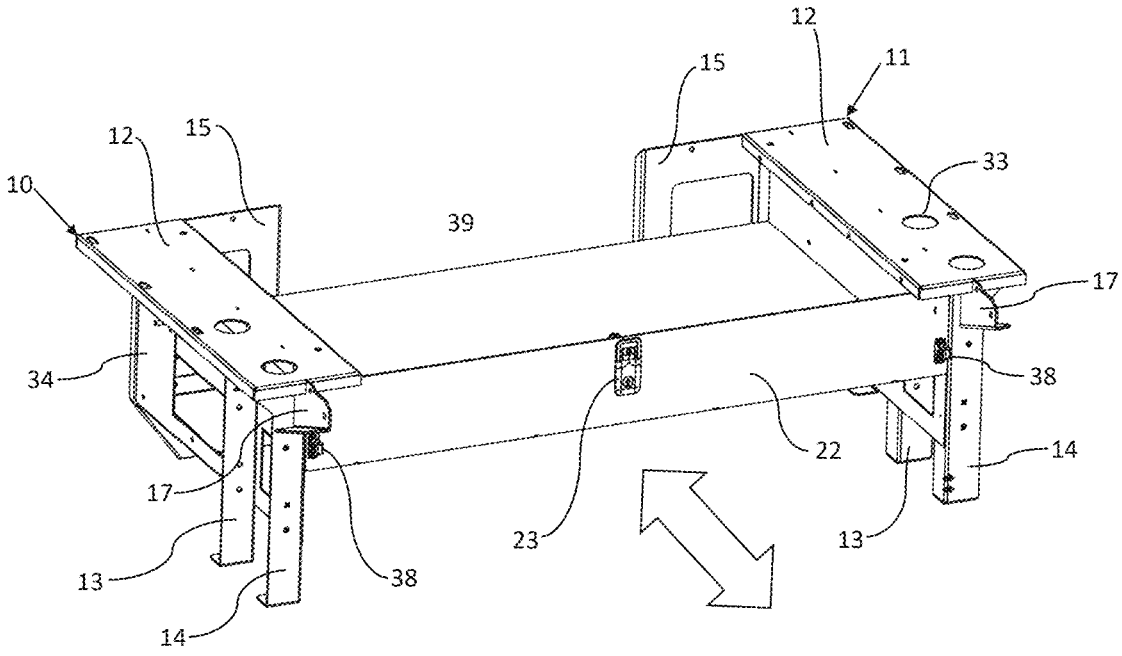

With the frame assembly driver side 10 and frame assembly passenger side 11 securely positioned and attached in the vehicle 50 the electronics tray 22 is attached to the locking drawer slides 16 as illustrated in FIG. 5. The gap 39 between the driver and passenger side frames 10 and 11 provides a space for electronics cables from devices attached to the electronics tray 22 to extend from and retract into when the electronics tray 22 is moved between its forward and aft positions.

Figure 6:
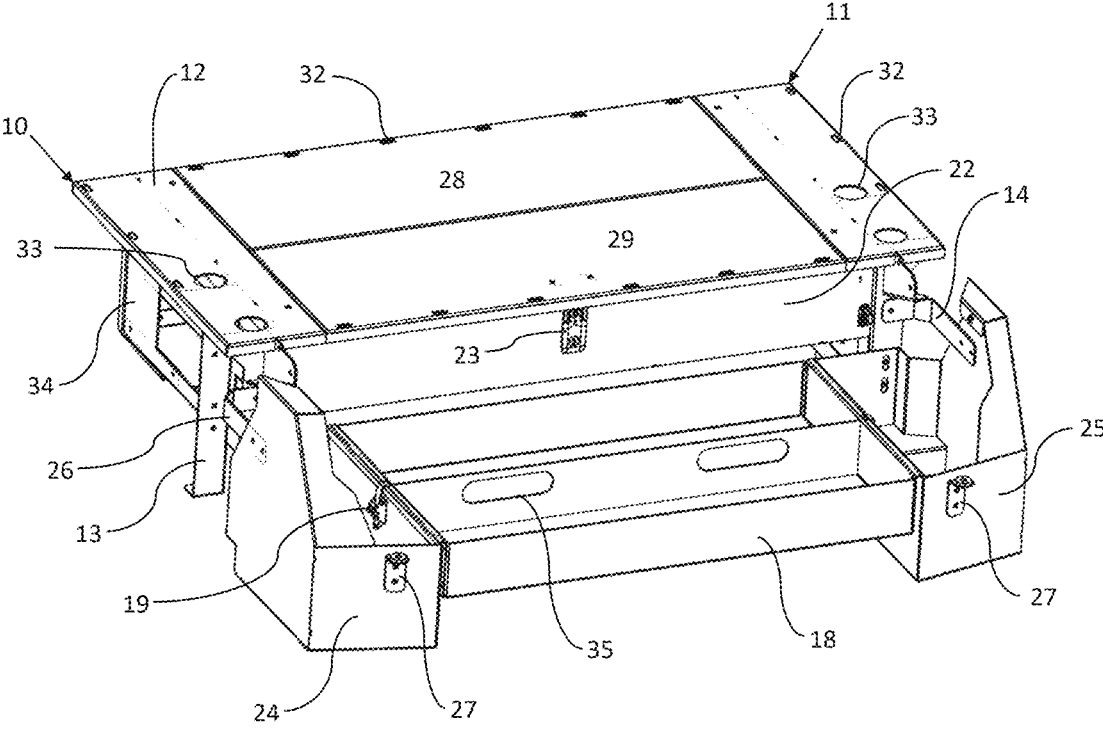

FIG. 6 illustrates the addition of a forward deck panel 28 and a rear deck panel 29 positioned between the frame top panels 12 and secured with screw-and-nut type fasteners positioned along the flange, which has been bent downward from the top surface of each of the panels 28, 29, 12. Panels 28, 29 include one or more ribs along the underside to add structural rigidity and support to the panels.

Figure 7:
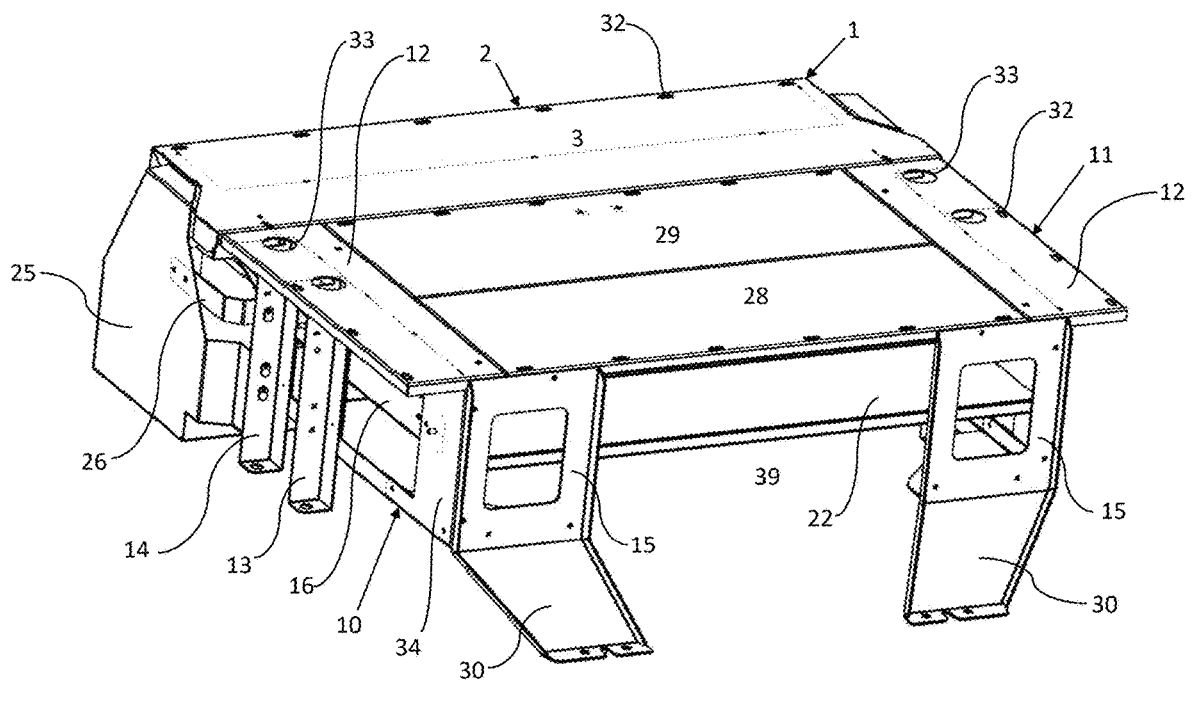

FIG. 7 provides an additional view of forward frame legs 30 that connect the frame assemblies 10 and 11 to the vehicle 50 and maintains the vertical position of the frame assemblies 10 and 11 within the vehicle.

We claim:

1. A storage deck for securement within the cargo area of a vehicle, the cargo area having a floor surface, the deck comprising:

a deck surface elevated above the floor surface of the vehicle, the deck surface creating a storage area underneath such deck surface and above the vehicle floor surface;

a support member secured to the vehicle and to the deck surface;

a lid secured to the support member or to the deck surface, the lid providing access to the storage area beneath the deck surface, the lid being movably secured such that it can be opened or closed, the lid having an inner side facing the storage area and an outer side opposite the inner side; and wherein the lid includes a lid stowage compartment accessible on the outer side of the lid.

2. The storage deck of claim 1, wherein the outer side of the lid conforms to an inner side of the vehicle.

3. The storage deck of claim 1, wherein the lid stowage compartment includes a retention member to hold items within the lid.

4. The storage deck of claim 1, further comprising at least one side stowage bin conforming to an inner shape of the vehicle and accessible under the lid.

5. The storage deck of claim 1, further comprising a removable tray under the deck surface and accessible under the lid, the tray being removable to access items beneath.

6. The storage deck of claim 5, further comprising a latch to secure the removable tray and compress it against the floor surface.

7. The storage deck of claim 6, wherein the latch is an over-center latch with a lever.

8. The storage deck of claim 1, wherein the lid is attached to the deck or support member with a hinge, the lid further comprising an opening assist mechanism, the lid being openable about the hinge to a position in which the lid maintains an open position by gravity or with the assistance of the opening assist mechanism.

9. The storage deck of claim 8, further comprising a magnetic catch securing the lid to the cargo deck when in a closed position.

10. The storage deck of claim 1, further comprising at least one stowage tray movably affixed under the deck surface, accessible when retracted rearward.

11. The storage deck of claim 10, wherein the movable stowage tray includes a locking mechanism.

12. The storage deck of claim 1, further comprising a plurality of holes along the deck surface perimeter.

13. A storage deck for securement within the cargo area of a vehicle, the cargo area having a floor surface, the deck comprising:

a deck surface elevated above the floor surface of the vehicle, the deck surface creating a storage area underneath such deck surface and above the vehicle floor surface;

a support member secured to the vehicle and to the deck surface;

a lid secured to the support member or to the deck surface, the lid providing access to the storage area beneath the deck surface, the lid being movably secured such that it can be opened or closed, the lid having an inner side facing the storage area and an outer side opposite the inner side;

wherein the lid includes a lid stowage compartment accessible on the outer side of the lid;

further comprising a removable tray positioned within the storage area, said tray configured to divide the storage area into multiple compartments, each compartment being accessible by opening the lid, or independently opening respective sections of the lid;

wherein the outer side of the lid conforms to the inside of the liftgate of the vehicle when the lid is closed, providing a substantially flush and integrated appearance.

14. The storage deck of claim 13, wherein the lid stowage compartment includes a retention member to hold items within the lid.

15. The storage deck of claim 13, wherein the lid is attached to the deck or support member with a hinge, the lid further comprising an opening assist mechanism, the lid being openable about the hinge to a position in which the lid maintains an open position by gravity or with the assistance of the opening assist mechanism.

16. A method for rapidly accessing items in the cargo area of a vehicle, comprising the following steps:

securing a storage deck within the cargo area of the vehicle, said storage deck being elevated above the surface of the vehicle, thereby creating a storage area underneath said deck surface and above the vehicle floor surface;

securing a lid to either the support member or the deck surface, said lid providing access to the storage area beneath the deck surface, and being movably secured to enable opening and closing of the lid, said lid having an inner side facing the storage area and an outer side opposite the inner side and incorporating a lid stowage compartment accessible on the outer side of the lid;

organizing and dividing the storage area into multiple compartments using removable trays;

arranging items within the storage area of the storage deck;

opening the lid by moving it away from the storage area, thereby providing rapid access to the items stored within the storage area; and closing the lid by moving it towards the storage area, securely enclosing the items within the storage area.

17. The method of claim 16 wherein additional items are stored in the lid stowage compartment accessible on the outer side of the lid.

18. The method of claim 17, wherein items are retained in the lid stowage compartment by a retention member.

19. The method of claim 16 wherein additional items are stored in at least one stowage tray movably affixed under the deck surface, accessible when retracted rearward.

* * * * *